(12) United States Patent
Kamijima

(10) Patent No.: US 8,070,297 B2
(45) Date of Patent: Dec. 6, 2011

(54) PROJECTOR THAT PROJECTS AN IMAGE SIGNAL ON A DISPLAY SURFACE

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 12/324,046

(22) Filed: Nov. 26, 2008

(65) Prior Publication Data

US 2009/0141252 A1    Jun. 4, 2009

(30) Foreign Application Priority Data

Dec. 3, 2007   (JP) .................................. 2007-312065

(51) Int. Cl.
*G03B 21/14* (2006.01)
(52) U.S. Cl. ............... 353/69; 353/20; 353/31; 353/33; 353/52; 353/85; 353/70; 353/101; 353/119; 353/122; 362/257; 362/259
(58) Field of Classification Search .................... 353/20, 353/29, 31, 33, 52, 85, 98, 119, 122, 69, 353/70, 101; 315/309, 297, 294, 291, 307, 315/312; 362/257, 259, 264; 385/27
See application file for complete search history.

(56) References Cited

U.S. PATENT DOCUMENTS

| 7,059,727 | B2 * | 6/2006 | Seki et al. ........................ 353/85 |
| 7,083,284 | B2 * | 8/2006 | Peterson et al. ................. 353/31 |
| 7,393,107 | B2 * | 7/2008 | Yonekubo et al. .............. 353/29 |
| 7,431,465 | B2 * | 10/2008 | Ozaki et al. ...................... 353/98 |
| 7,513,624 | B2 * | 4/2009 | Yavid et al. ...................... 353/31 |
| 7,520,621 | B2 * | 4/2009 | Kitabayashi .................... 353/69 |
| 7,795,822 | B2 * | 9/2010 | Arai et al. ........................ 315/309 |
| 7,866,822 | B2 * | 1/2011 | Yokoyama et al. ............. 353/31 |
| 2002/0030793 | A1 * | 3/2002 | Mihara ............................ 353/31 |
| 2004/0247240 | A1 * | 12/2004 | Teramura et al. ............... 385/27 |
| 2006/0244925 | A1 * | 11/2006 | Seki et al. ........................ 353/52 |
| 2007/0195287 | A1 * | 8/2007 | Chiang et al. ................... 353/84 |
| 2008/0158522 | A1 * | 7/2008 | Seo ................................... 353/85 |
| 2009/0141250 | A1 * | 6/2009 | Destain .......................... 353/69 |

FOREIGN PATENT DOCUMENTS

JP    A-2003-269915    9/2003

OTHER PUBLICATIONS

Aram Mooradian et al.; "High Power Extended Vertical Cavity Surface Emitting Diode Lasers and Arrays and Their Applications"; Micro-Optics Conference, Tokyo; Nov. 2, 2005; pp. 1-4.

* cited by examiner

*Primary Examiner* — William C Dowling
*Assistant Examiner* — Sultan Chowdhury
(74) *Attorney, Agent, or Firm* — Oliff & Berridge, PLC

(57) ABSTRACT

A projector that projects video light corresponding to an image signal onto a display surface includes: a light source device that emits light; a housing that houses at least the light source device; a projection lens, that is, an optical element that transmits the video light projected onto the display surface and emits the video light toward the outside of the housing; a detecting unit that detects detection light supplied to the optical element; and a control unit that adjusts a light amount of the video light on the basis of a result of the detection by the detecting unit. The projector is set such that, when the optical element is in a normal setting state, the light amount density of the video light is equal to or lower than a predetermined value on an emission surface for emitting the video light of the optical element.

15 Claims, 10 Drawing Sheets

PROJECTOR THAT PROJECTS AN IMAGE SIGNAL ON A DISPLAY SURFACE

BACKGROUND

1. Technical Field

The present invention relates to a projector, and, more particularly to a technique for a projector that displays an image using a laser beam.

2. Related Art

In recent years, there is proposed a technique for using a laser beam source as a light source device for a projector. The laser beam source is developed as a light source for a projector according to an increase in power and an increase in colors. Compared with a UHP lamp used in the past as a light source for a projector, the laser beam source has advantages that, besides being small in size, for example, color reproducibility is high, instantaneous lighting is made possible, the durable life is long. It is possible to display a bright image by using the laser beam source with high power. On the other hand, it is necessary to take measures for preventing deficiencies that are likely to be caused by laser beams such as the influence of a laser beam affecting the eyes when the laser beam directly enters the eyes. For example, JP-A-2003-269915 proposes a technique for a three-dimensional monitoring device that makes it possible to highly accurately detect an object that enters a three-dimensional space. By applying such a technique to a projector and taking measures for, for example, detecting an object that enters a monitoring region to which a laser beam travels and stopping the output of the laser beam, it is possible to prevent the deficiencies that are likely to be caused by laser beams.

The projector is assumed to be used in all kinds of situations. Not only a person but also, for example, an object other than a person may enter the monitoring region. A monitoring image may change from an initial state for some cause, for example, a change in brightness in the monitoring region. Therefore, it is possible that the output of video light is frequently stopped even when it is unnecessary to stop the output. When the unnecessary stop of the output is frequency performed, comfortable video entertainment is hindered. If it is necessary to perform an arithmetic operation using an extremely large number of parameters in order to highly accurately detect that a person enters the monitoring region, the structure for monitoring is complicated. In this way, the technique in the past causes a problem that it is difficult to realize, with a simple configuration, both reduction in deficiencies that are likely to be caused by light and comfortable video entertainment.

SUMMARY

An advantage of some aspect of the invention is to provide a projector that makes it possible to realize both reduction in deficiencies that are likely to be caused by light and comfortable video entertainment and has a simple configuration.

According to an aspect of the invention, there is provided a projector that projects video light corresponding to an image signal onto a display surface, the projector including: a light source device that emits light; a housing that houses at least the light source device; an optical element that transmits the video light projected onto the display surface and emits the video light toward the outside of the housing; and a detecting unit that detects detection light supplied to the optical element, wherein the light amount density of the video light is equal to or lower than a predetermined value on an emission surface for emitting the video light of the optical element, and a light amount of the video light is adjusted on the basis of a result of the detection by the detecting unit. According to another aspect of the invention, there is provided a projector that projects video light corresponding to an image signal onto a display surface, the projector including: a light source device that emits light; a housing that houses at least the light source device; an optical element that transmits the video light projected onto the display surface and emits the video light toward the outside of the housing; a detecting unit that detects detection light supplied to the optical element; a control unit that adjusts a light amount of the video light on the basis of a result of the detection by the detecting unit, wherein the projector is set such that, when the optical element is in a normal setting state, the light amount density of the video light is equal to or lower than a predetermined value on an emission surface for emitting the video light of the optical element.

The predetermined value of the light amount density of the video light on the emission surface of the optical element is determined on the basis of a maximum light amount allowed to be emitted under a standard in, for example, a product that emits a laser beam. Since the light amount density on the emission surface is set equal to or lower than the predetermined value, only when the housing is closed by using the optical element, a situation in which light having light amount density higher than the predetermined value is irradiated on a person is prevented. The detecting unit monitors removal or breakage of the optical element by detecting the detection light. When removal or breakage of the optical element occurs, a light amount of the detection light detected by the detecting unit changes. The situation in which light having light amount density higher than the predetermined value is irradiated on a person is prevented by reducing a light amount of the video light or stopping the output of the video light according to such a change in the detection result. Compared with the application of image recognition, a configuration for monitoring can be simplified. Unnecessary adjustment of the video light can be reduced when it is unnecessary to stop the output of the video light. This makes it possible to obtain a projector that makes it possible to realize both reduction in deficiencies that are likely to be caused by light and comfortable video entertainment and has a simple configuration.

It is preferable that the projector further includes a light source unit for detection that emits the detection light. This makes it possible to supply the detection light from a desired position.

It is preferable that the light source device includes: a light source unit that emits light having a first wavelength; and a wavelength converting section that makes the light having the first wavelength, which is emitted from the light source unit, incident thereon to thereby emit the light having the first wavelength and light having a second wavelength different from the first wavelength, the detection light is the light having the first wavelength emitted from the wavelength converting section, and the video light is the light having the second wavelength emitted from the wavelength converting section. This makes it possible to make the light source unit for detection unnecessary and effectively use the light having the first wavelength emitted from the wavelength converting section.

It is preferable that the optical element is a lens configuring a projection optical system that projects the video light. This makes it possible to project the video light and emit the video light toward the outside of the housing.

It is preferable that the optical element transmits the video light projected by the projection optical system. This makes it possible to emit the projected video light toward the outside of the housing.

It is preferable that an incident surface of the optical element on which the video light is made incident is tilted with respect to a surface orthogonal to an optical axis of the projection optical system. This makes it possible to reduce mirror reflection of the video light on the incident surface of the optical element and efficiently emit the video light.

It is preferable that the emission surface for emitting the video light of the optical element is tilted with respect to a surface orthogonal to an optical axis of the projection optical system. This makes it possible to emit the video light, a tilt angle of which is adjusted, using a small projection optical system.

It is preferable that the detection light is invisible light. This makes it possible to prevent the detection light from hindering video entertainment and perform comfortable video entertainment.

It is preferable that the projector further includes a transmitting and reflecting section that reflects invisible light and transmits visible light. This makes it possible to reduce deficiencies caused by the emission of the invisible light from the projector.

It is preferable that the detection light is made incident at a predetermined incident angle on an incident surface on which the video light is made incident of the optical element. By appropriately setting an incident angle of the detection light, it is possible to detect, with the detecting unit, the detection light mirror-reflected on the incident surface of the optical element.

It is preferable that the optical element propagates the detection light and the detecting unit is provided at an outer edge of the optical element. By detecting the detection light propagating through the inside of the optical element, it is possible to accurately detect breakage of the optical element and further reduce deficiencies.

It is preferable that the projector further includes a detection-light reflecting section that is provided at an outer edge of the optical element and reflects the detection light. This makes it possible to propagate the detection light in the inside of the optical element.

It is preferable that the light source unit for detection is provided near the detecting unit. This makes it possible to effectively use a space in the housing and easily design the projector.

It is preferable that the projector further includes a detection-light guiding section that guides the detection light to the detecting unit. This makes it possible to easily mount the detecting unit. It is possible to monitor breakage in many places of the optical element.

It is preferable that the light source device emits a laser beam. This makes it possible to perform image display using the laser beam. According to the invention, it is possible to configure the laser beam source conforming to standards required for apparatuses that use laser beam sources.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained in detail below with reference to the accompanying drawings.

First Embodiment

Figure 1:
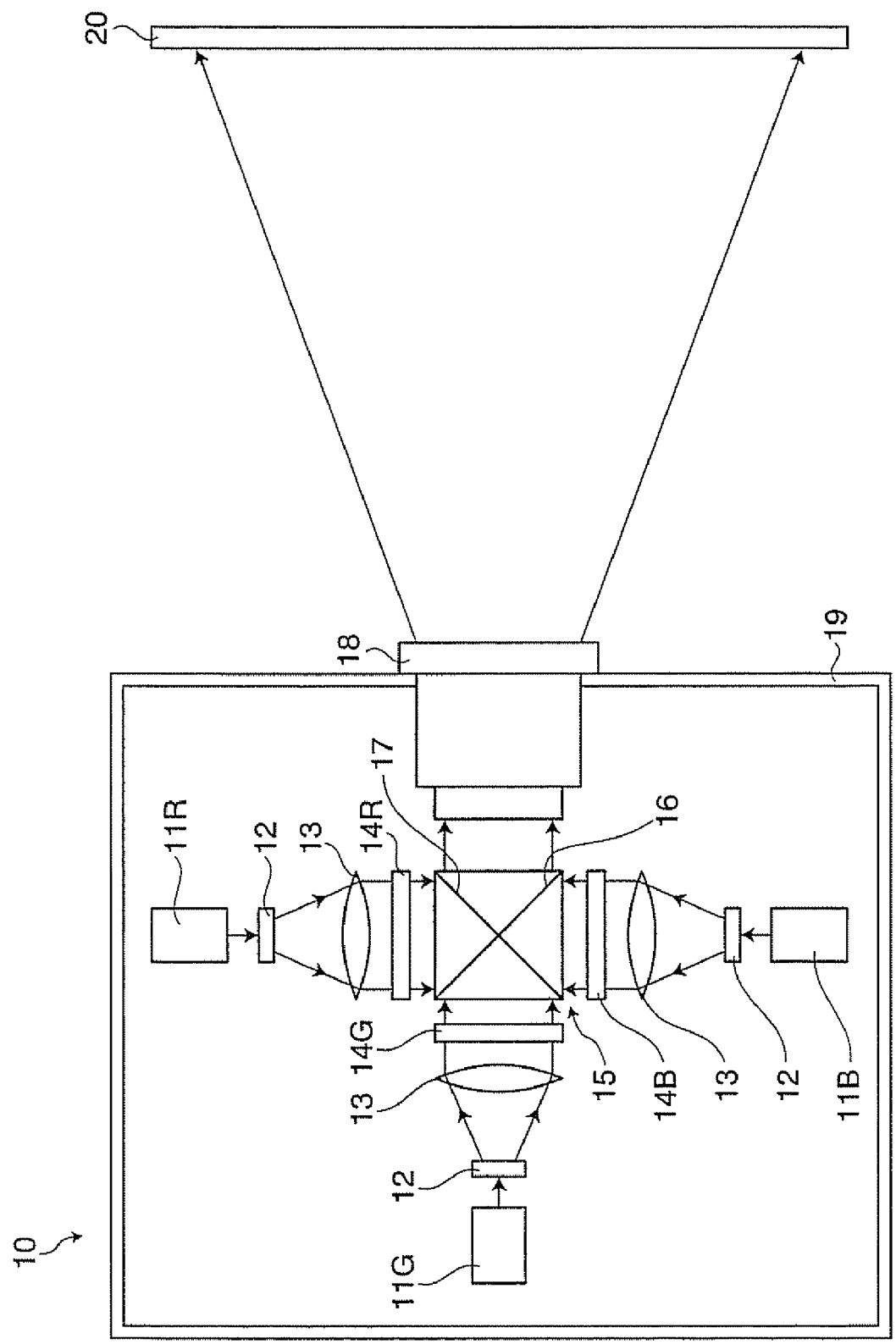
FIG. 1 is a diagram of a schematic configuration of a projector according to a first embodiment of the invention.

FIG. 1 is a diagram of a schematic configuration of a projector 10 according to a first embodiment of the invention. The projector 10 is a front projection projector that projects video light corresponding to an image signal onto a display surface of a screen 20. A user enjoys video by observing video light reflected on the screen 20. The projector 10 includes a light source device for red (R) light 11R, a light source device for green (G) light 11G, and a light source device for blue (B) light 11B. The light source device for R light 11R, the light source device for G light 11G, and the light source device for B light 11B are laser beam sources including semiconductor elements.

The light source device for R light 11R is a light source device that emits R light. A diffusing element 12 performs shaping and expansion of an illumination region and uniformalization of a light amount distribution in the illumination region. As the diffusing element 12, for example, a computer generated hologram (CGH) as a diffractive optical element can be used. A field lens 13 parallelizes light from the light source device for R light 11R and makes the light incident on a spatial-light modulating device for R light 14R. The spatial-light modulating device for R light 14R is a spatial-light modulating device that modulates the R light according to an image signal and is a transmission liquid crystal display device. The R light modulated by the spatial-light modulating device for R light 14R is made incident on a cross dichroic prism 15 as a color combination optical system.

The light source device for G light 11G is a light source device that emits G light. Light passing through the diffusing element 12 and the field lens 13 is made incident on a spatial-light modulating device for G light 14G. The spatial-light modulating device for G light 14G is a spatial-light modulating device that modulates the G light according to an image signal and is a transmission liquid crystal display device. The G light modulated by the spatial-light modulating device for G light 14G is made incident on a surface different from a surface on which the R light is made incident in the cross dichroic prism 15.

The light source device for B light 11B is a light source device that emits B light. Light passing through the diffusing element 12 and the field lens 13 is made incident on a spatial-light modulating device for B light 14B. The spatial-light modulating device for B light 14B is a spatial-light modulating device that modulates the B light according to an image signal and is a transmission liquid crystal display device. The B light modulated by the spatial-light modulating device for B light 14B is made incident on a surface different from the surface on which the R light is made incident and the surface on which the G light is made incident in the cross dichroic prism 15. As the transmission liquid crystal display devices, for example, high temperature polysilicon (HTPS) TFT liquid crystal panels can be used.

The cross dichroic prism 15 includes two dichroic films 16 and 17 arranged to be substantially orthogonal to each other. The first dichroic film 16 reflects the R light and transmits the G light and the B light. The second dichroic film 17 reflects the B light and transmits the R light and the G light. The cross dichroic prism 15 combines the R light, the G light, and the B light made incident from different directions, respectively, and emits combined video light in the direction of a projection lens 18. The projection lens 18 configures a projection optical system that projects the video light from the cross dichroic prism 15 onto a display surface of a screen 20. A housing 19 houses components in an optical path from the light source devices for color lights 11 R, 11 G, and 11 B to the cross dichroic prism 15. The projection lens 18 is provided to close an opening formed in the housing 19. The projection lens 18 is an optical element that transmits the video light projected onto the display surface of the screen 20 and emits the video light toward the outside of the housing 19.

Figure 2:
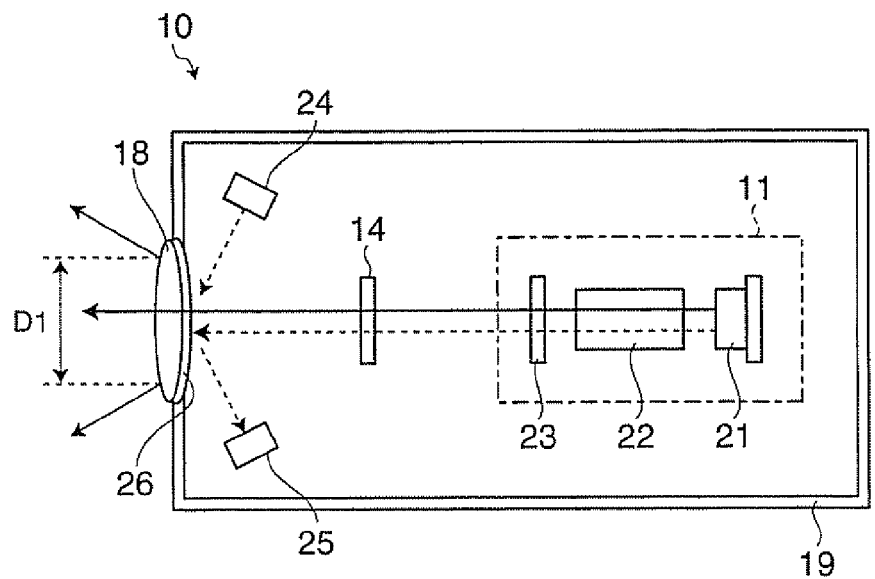
FIG. 2 is a schematic diagram for explaining characteristic portions of the projector.

FIG. 2 is a schematic diagram for explaining characteristic portions of the projector 10. In the figure, the light source devices for color lights 11R, 11G, and 11B are replaced with a light source device 11. The spatial-light modulating devices for color lights 14R, 14G, and 14B are replaced with a spatial-light modulating device 14. Among the components of the projector 10, those unnecessary for explanation are not shown in FIG. 1. The light source device 11 includes a light source unit 21, a second-harmonic generation (SHG) element 22, and an external resonator 23.

The light source unit 21 is a semiconductor element that emits a fundamental wave light having a first wavelength and is, for example, a surface-emitting semiconductor element. The fundamental wave light is, for example, infrared light. The light source unit 21 has a not-shown mirror layer that reflects light having the first wavelength. The SHG element 22 functions as a wavelength converting section that makes the fundamental wave light from the light source unit 21 incident thereon to thereby emit the fundamental wave light and harmonic light having a second wavelength. The second wavelength is a wavelength equivalent to a half of the first wavelength. The harmonic light is, for example, visible light. The SHG element 22 converts a wavelength of light emitted from the light source unit 21. The SHG element 22 is, for example, periodically poled lithium niobate (PPLN) of lithium niobate ($LiNbO_3$) as nonlinear optical crystal.

The external resonator 23 causes the fundamental wave light from the light source unit 21 to resonate between the external resonator 23 and a mirror layer of the light source unit 21. The external resonator 23 is a narrow band reflection mirror that has a reflection characteristic with half width equal to or smaller than several nanometers around the first wavelength in an infrared region. The external resonator 23 transmits light in a wide wavelength region including the second wavelength in a visible region. As the external resonator 23, for example, VHG (Volume Holographic Grating) as a volume hologram can be used. The VHG can be formed by using photorefractive crystal such as $LiNbO_3$ or BGO, polymer, or the like.

The fundamental wave light emitted from the light source unit 21 is made incident on the SHG element 22. The harmonic light generated by the SHG element 22 and a part of the fundamental wave light transmitted through the SHG element 22 are transmitted through the external resonator 23 and emitted to the outside of the light source device 11. A part of the fundamental wave light transmitted through the SHG element 22 from a side on which the light source unit 21 is provided is reflected on the external resonator 23. The fundamental wave light reflected on the external resonator 23 is made incident on the SHG element 22. The fundamental wave light made incident on the SHG element 22 from the external resonator 23 and transmitted through the SHG element 22 is made incident on the light source unit 21. The fundamental wave light made incident on the light source unit 21 is, after being reflected on the mirror layer of the light source unit 21, emitted from the light source unit 21 to the SHG element 22. The fundamental wave light reflected on the mirror layer and the external resonator 23 is amplified by resonating with fundamental wave light emitted from the light source unit 21 anew.

The harmonic light made incident on the spatial-light modulating device 14 is, after being modulated according to an image signal, made incident on the projection lens 18. A transmitting and reflecting section 26 is formed on an incident surface of the projection lens 18. The transmitting and reflecting section 26 is a dielectric multilayer film that reflects infrared light and transmits visible light. The harmonic light made incident on the transmitting and reflecting section 26 is transmitted through the transmitting and reflecting section 26. The projection lens 18 is coated with a reflection preventing film (AR coat) for reducing the reflection of the visible light. By providing the AR coat, it is possible to reduce the reflection of the harmonic light on an interface of the projection lens 18 and efficiently transmit the harmonic wave to the projection lens 18.

The fundamental wave light transmitted through the spatial-light modulating device 14 and made incident on the transmitting and reflecting section 26 is reflected on the transmitting and reflecting section 26. Since the fundamental wave light as infrared light is reflected on the transmitting and reflecting section 26, it is possible to reduce deficiencies due to the emission of the infrared light from the projector 10.

A light source unit for detection 24 and a detecting unit 25 are provided in, in the inside of the housing 19, positions other than a position on which light traveling from the spatial-light modulating device 14 to the projection lens 18 is made incident. The light source unit for detection 24 emits detection light as infrared light. The detection light from the light source unit for detection 24 is reflected on the transmitting and reflecting section 26 provided in the projection lens 18 and travels in the direction of the detecting unit 25. The detecting unit 25 detects the detection light supplied from the light source unit for detection 24 to the projection lens 18 and reflected on the projection lens 18. As the detecting unit 25, a light receiving element that converts incident light into an electronic signal, for example, photodiode combined with a filter that blocks visible light and transmits infrared light can be used.

The video light transmitted through the projection lens 18 passes through a region D1 of an emission surface from which the video light is emitted of the projection lens 18. The projector 10 is set such that the light amount density of the video light is equal to or lower than a predetermined value on the emission surface of the projection lens 18. The light amount density is calculated by dividing a light amount of the video light on the emission surface of the projection lens 18 by an area of the region D1. The predetermined value of the light amount density is set to be equal to or lower than maximum light amount density allowed to be emitted to the outside of the housing under a standard in a product (e.g., a projector) that emits light based on a laser beam source from the housing. For example, the predetermined value can be set on the basis of a light amount equivalent to a class 3B of International Standard CEI IEC 60825-1 (Group Safety Publication) set for a laser beam. In the standard set in March 2007, the class 3B is a light amount with which maximum energy received by pupils in 0.25 second, which is time during which a blink as a repulsion reaction to visible light is performed, is 0.5 W.

Since the light amount density on the emission surface of the projection lens 18 is set equal to or lower than the predetermined value, as long as the housing 19 is closed by using the projection lens 18, a situation in which a laser beam having light amount density higher than the predetermined value is irradiated on a person is prevented. The predetermined value of the light amount density of the video light only has to be a value with which deficiencies due to light can be prevented. The predetermined value can be appropriately set according to contents of a standard.

Figure 3:
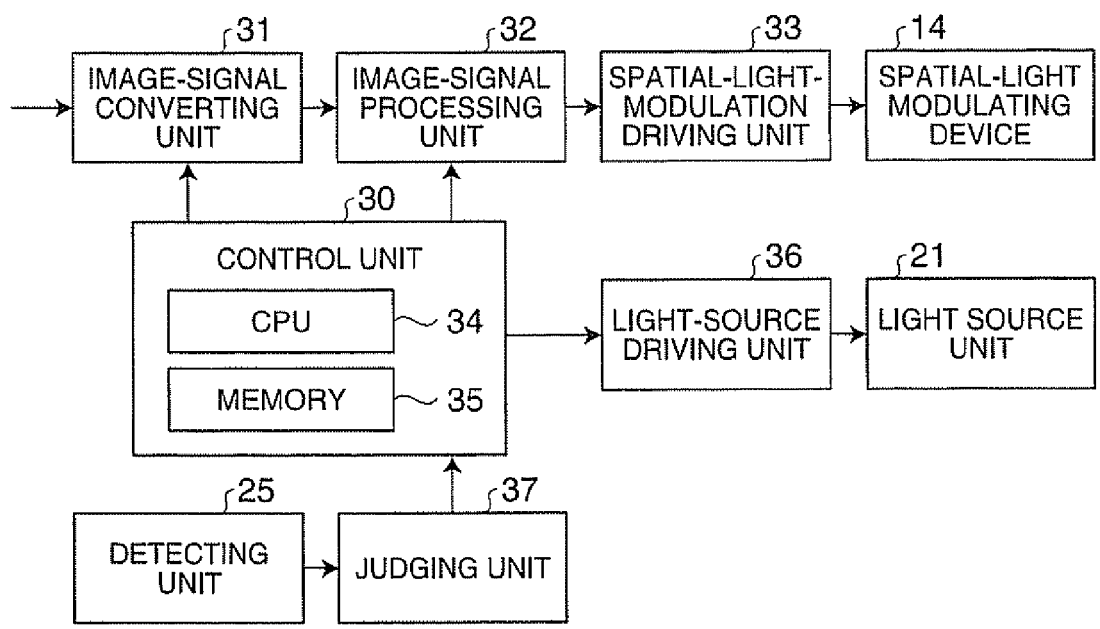
FIG. 3 is a diagram of a block configuration for controlling a light amount of video light.

FIG. 3 is a diagram of a block configuration for controlling a light amount of the video light. A control unit 30 includes a CPU (Central Processing Unit) 34 and a memory 35 and functions as a computer. The memory 35 includes a flash ROM (Read Only Memory). The control unit 30 actuates the CPU 34 according to a control program stored in the memory 35 to thereby control driving of the projector 10. An image-signal converting unit 31 converts an image signal inputted from an external apparatus or the like into a format that can be processed by an image-signal processing unit 32. The image-signal converting unit 31 converts the image signal on the basis of the control by the control unit 30. The image-signal converting unit 31 converts, for example, an image signal inputted as an analog signal into a digital signal.

The image-signal processing unit 32 applies various kinds of processing for image quality adjustment to the image signal converted by the image-signal converting unit 31. The processing for image quality adjustment is, for example, resolution conversion for converting resolution to match the number of pixels of the spatial-light modulating device 14, luminance adjustment, contrast adjustment, and sharpness adjustment. A spatial-light-modulation driving unit 33 drives the spatial-light modulating device 14 on the basis of the image signal processed by the image-signal processing unit 32. A light-source driving unit 36 drives the light source unit 21 on the basis of the control by the control unit 30.

The detecting unit 25 monitors removal and breakage of the projection lens 18 by detecting detection light. A judging unit 37 judges, on the basis of a result of the detection by the detecting unit 25, whether a light amount of video light should be adjusted. Unless removal and breakage of the projection lens 18 occurs, a light amount of the detection light detected by the detecting unit 25 is substantially fixed. On the other hand, when removal or breakage of the projection lens 18 occurs, a light amount of the detection light detected by the detecting unit 25 changes. The judging unit 37 judges, according to the change in the light amount of the detection light detected by the detecting unit 25, whether a light amount of the video light should be adjusted.

When it is not judged by the judging unit 37 that a light amount of the video light is adjusted, the control unit 30 controls the light source unit 21 as usual. When it is judged by the judging unit 37 that a light amount of the video light is adjusted, the light-source driving unit 36 stops the power supply to the light source unit 21 on the basis of the control by the control unit 30. According to the stop of the power supply to the light source unit 21, the projector 10 stops the output of the video light. In this way, the projector 10 adjusts a light amount of the video light on the basis of a result of the detection by the detecting unit 25.

When removal or breakage of the projection lens 18 occurs, it is likely that a laser beam having light amount density higher than the predetermined value is irradiated on a person because, for example, the person brings the face close to the inside of the housing 19 or the person inserts a mirror into the housing 19. Therefore, when removal or breakage of the projection lens 18 occurs, the output of the video light is stopped to prevent the situation in which a laser beam having light amount density higher than the predetermined value is irradiated on the person. Compared with the application of image recognition, it is possible to reduce unnecessary adjustment of the video light when a reduction in a light amount of the video light and the stop of the output of the video light are unnecessary. Moreover, it is possible to simplify a configuration for monitoring. Consequently, there is an effect that it is possible to realize both reduction in deficiencies that are likely to be caused by light and comfortable video entertainment and simply configure the projector 10.

For example, in the case of a rear projector with which a user observes video light transmitted through a screen, it is conceivable to monitor the screen as a display surface. A relatively large configuration is necessary to monitor a wide region. In the case of the front projection projector 10 according to the invention, the optical element in a region narrower than the screen is monitored instead of the screen as the display surface. Since a configuration for monitoring the narrow region only has to be used, there is an advantage that it is possible to simplify a configuration for monitoring.

Since the infrared light as the invisible light is used as the detection light, it is possible to prevent the detection light from hindering video entertainment and perform comfortable video entertainment. Besides always performing monitoring with the detection light while the video light is projected, the projector 10 may, after checking presence or absence of abnormality of the projection lens 18 before projecting the video light, start the projection of the video light. Since the infrared light is used as the invisible light, there is an advantage that it is possible to reduce deterioration in a member used for the projector 10, e.g., an organic material.

When it is judged by the judging unit 37 that a light amount of the video light is adjusted, besides stopping the output of the video light, the control unit 30 may reduce a light amount of the video light to a degree for not causing deficiencies even if a laser beam is made incident on a person. Since it is possible to perform the stop of the output of the video light or the reduction in a light amount of the video light, it is possible to prevent the situation in which a laser beam having light amount density higher than the predetermined value is irradiated on a person.

The control unit 30 is not limited to the adjustment of a light amount of the video light through the control of the light source unit 21. The control unit 30 may adjust a light amount of the video light though the control of the spatial-light modulating device 14. For example, it is possible to stop the output of the video light by representing a lowest gradation with all pixels. A blocking member that can block the video light may be provided in the projector 10. The output of the video light may be stopped by controlling the blocking member using the control unit 30.

Figure 4:
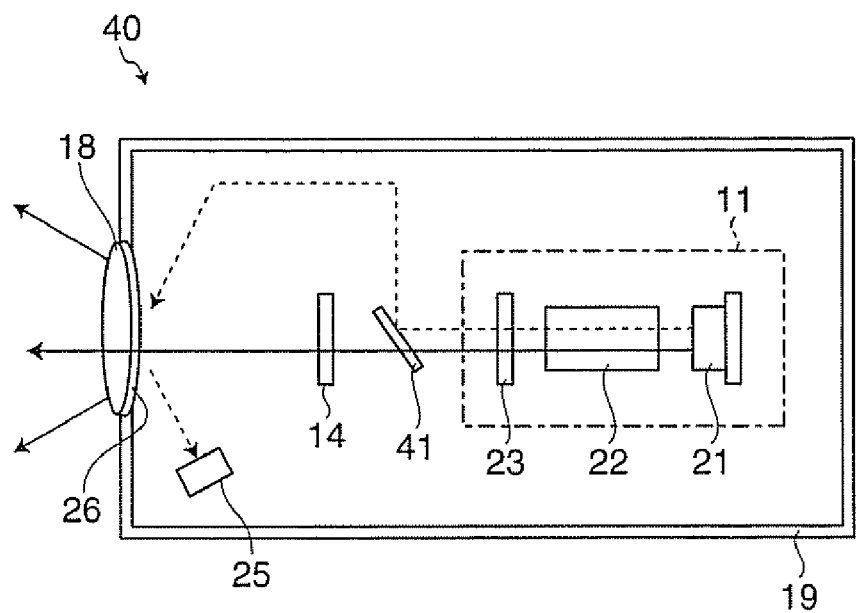
FIG. 4 is a diagram for explaining a projector according to a modification of the first embodiment.

FIG. 4 is a diagram for explaining a projector 40 according to a modification of this embodiment. The projector 40 according to this modification is characterized by using fundamental wave light emitted from the light source device 11 as detection light. A wavelength separation mirror 41 is provided in an optical path between the light source device 11 and the spatial-light modulating device 14. The wavelength separation mirror 41 reflects infrared light and transmits visible light to thereby separate the infrared light and the visible light. Harmonic light made incident on the wavelength separation mirror 41 is, after being transmitted through the wavelength separation mirror 41, made incident on the spatial-light modulating device 14. The video light is the harmonic light emitted from the SHG element 22.

The fundamental wave light made incident on the wavelength separation mirror 41 is, after being reflected on the wavelength separation mirror 41, supplied to the projection lens 18 as detection light. The detection light is the fundamental wave light emitted from the SHG element 22. As a light guiding member that supplies light reflected on the wavelength separation mirror 41 to the projection lens 18, for example, an optical fiber can be used. This makes it possible to make the light source unit for detection unnecessary and effectively use the fundamental wave light emitted from the SHG element 22. In this embodiment, the light source device 11 may be, for example, a diode pumped solid state (DPSS) laser. An optical element such as a filter for polarization selection may be provided in the light source device 11 when necessary. For example, the light source device for R light 11R among the light source devices for color lights 11R, 11G, and 11B may directly emit the fundamental wave light received from the light source unit 21 without using the SHG element 22.

Second Embodiment

Figure 5:
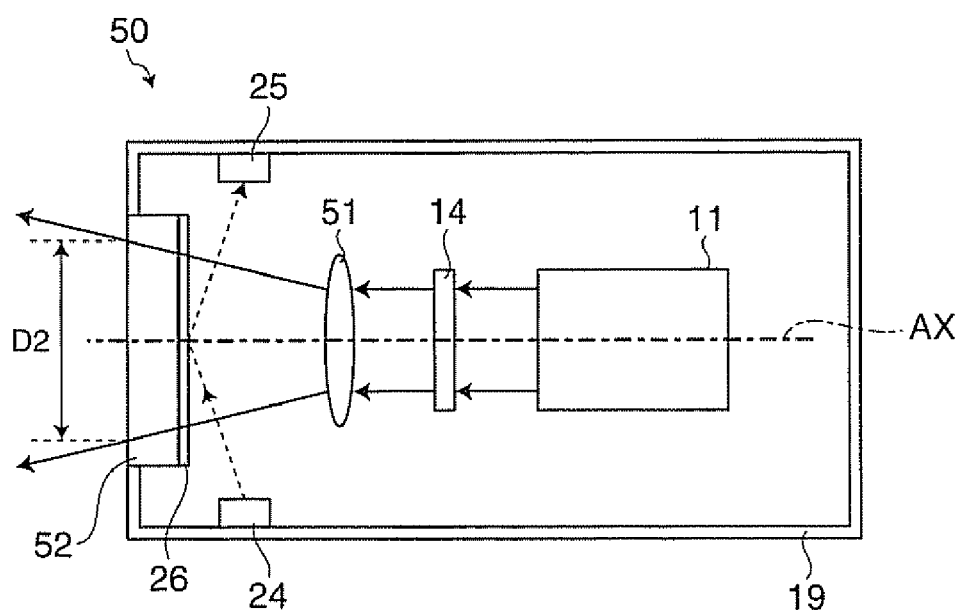
FIG. 5 is a diagram for explaining a projector according to a second embodiment of the invention.

FIG. 5 is a diagram for explaining a projector 50 according to a second embodiment of the invention. Components same as those in the first embodiment are denoted by the same reference numerals and signs and redundant explanation of the components is omitted. The light source device 11, the spatial-light modulating device 14, the projection lens 51, the light source unit for detection 24, and the detecting unit 25 are stored in the inside of the housing 19. A transmitting unit 52 is provided to close the opening formed in the housing 19. The transmitting unit 52 is an optical element that transmits video light projected by the projection lens 51 and emits the video light toward the outside of the housing 19. The transmitting unit 52 is a transparent member formed in a plate shape. The transmitting and reflecting section 26 is formed on an incident surface on which the video light is made incident of the transmitting unit 52. The transmitting unit 52 is coated with not-shown AR coat for reducing the reflection of the visible light.

The light source unit for detection 24 makes detection light incident at a predetermined incident angle on the incident surface of the transmitting unit 52. It is assumed that the incident angle is an angle formed by a perpendicular of the incident surface of the transmitting unit 52 and a light beam. In this embodiment, the perpendicular of the incident surface of the transmitting unit 52 substantially coincides with an optical axis AX of the projection lens 51. It is assumed that the predetermined incident angle is an incident angle at which the detection light can be reflected on the incident surface of the transmitting unit 52. Since the detection light is made incident at the predetermined incident angle on the incident surface of the transmitting unit 52, when a part of the detection light made incident on the transmitting and reflecting section 26 is transmitted through the transmitting and reflecting section 26, the detection light can be reflected on the incident surface of the transmitting unit 52. Consequently, besides reducing the emission of the detection light from the projector 50, it is possible to efficiently make the detection light incident on the detecting unit 25. The transmitting and reflecting section 26 may be provided in a position other than the incident surface of the transmitting unit 52, for example, an emission surface of the transmitting unit 52. In this case, as in the case explained above, since the detection light is made incident at the predetermined incident angle on the incident surface of the transmitting unit 52, it is possible to reflect the detection light on the incident surface of the transmitting unit 52.

The video light transmitted through the transmitting unit 52 passes through a region D2 on the emission surface of the transmitting unit 52. The projector 50 is set such that the light amount density of the video light is equal to or lower than a predetermined value on the emission surface of the transmitting unit 52. The predetermined value of the light amount density can be set in the same manner as the first embodiment. In this embodiment, as in the first embodiment, it is possible to realize both reduction in deficiencies likely to be caused by light and comfortable video entertainment and simply configure the projector 50.

Figure 6:
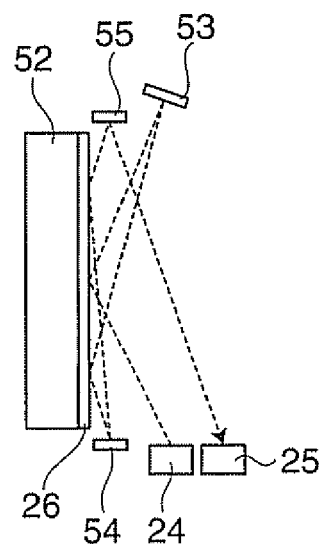
FIG. 6 is a diagram for explaining a modification of the second embodiment.

FIG. 6 is a diagram for explaining a modification of this embodiment. This modification is characterized by including plural mirrors 53, 54, and 55 that reflect detection light traveling from the light source unit for detection 24 to the detecting unit 25. The mirrors 53, 54, 55 are provided in, in the inside of the housing 19 (see FIG. 5), positions other than a position on which light traveling from the projection lens 51 to the transmitting unit 52 is made incident. The mirrors 53, 54, and 55 are formed by using a highly reflective member that reflects infrared light. The mirrors 53, 54, and 55 function as detection-light guiding sections that guide the detection light to the detecting unit 25.

Detection light emitted from the light source unit for detection 24 is, after being reflected on the transmitting and reflecting section 26, made incident on the first mirror 53. The detection light reflected on the first mirror 53 is, after being reflected on the transmitting and reflecting section 26, made incident on the second mirror 54. The detection light reflected on the second mirror 54 is, after being reflected on the transmitting and reflecting section 26, made incident on the third mirror 55. The detection light reflected on the third mirror 55 is made incident on the detecting unit 25.

Figure 7:
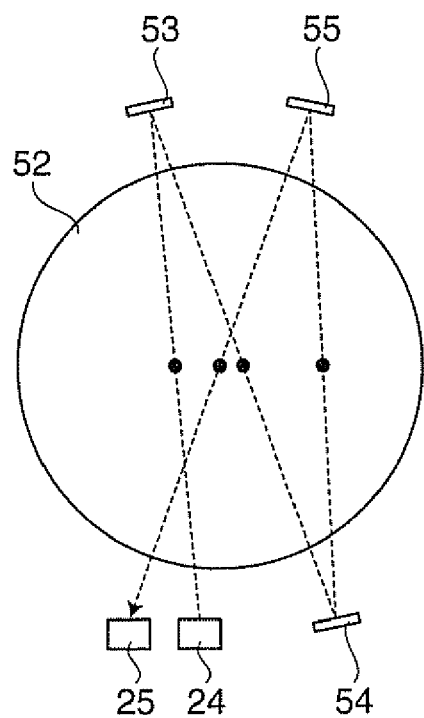
FIG. 7 is a diagram for explaining positions where detection light is reflected on an incident surface of a transmitting unit.

FIG. 7 is a diagram for explaining positions in which detection light is reflected on the incident surface of the transmitting unit 52. Since the mirrors 53, 54, and 55 are provided, the detection light emitted from the light source unit for detection 24 is reflected in different four places on the incident surface of the transmitting unit 52 until the detection light is made incident on the detecting unit 25. In this way, since the mirrors 53, 54, and 55 are used, it is possible to reflect the detection light in the plural places of the transmitting unit 52 and monitor breakage in the plural places. The number and the positions of mirrors functioning as detection-light guiding sections are not limited to those explained in this modification and may be changed as appropriate.

Third Embodiment

Figure 8:
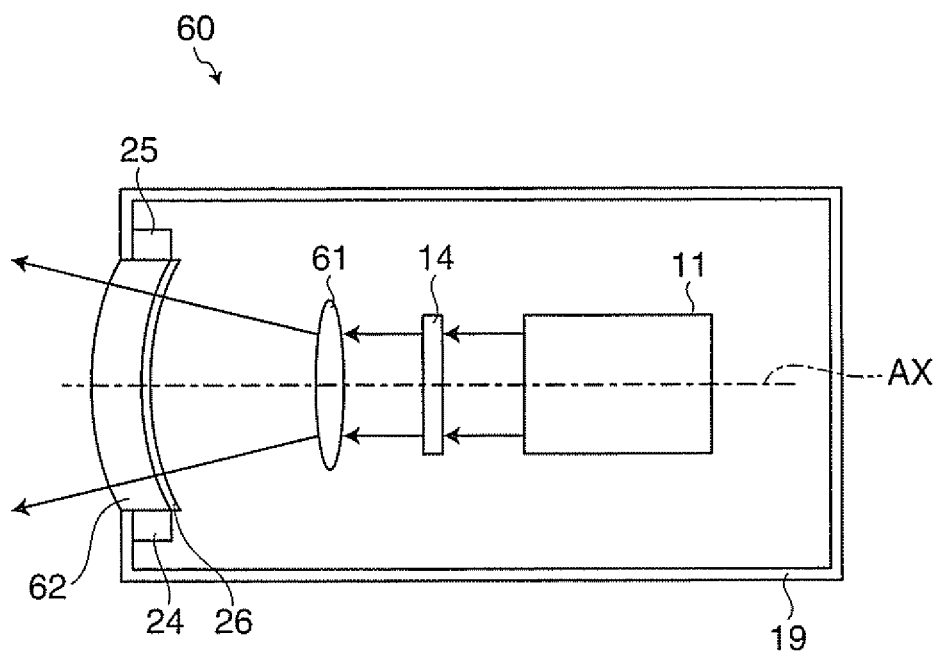
FIG. 8 is a diagram for explaining a projector according to a third embodiment of the invention.

FIG. 8 is a diagram for explaining a projector 60 according to a third embodiment of the invention. Components same as those in the embodiments explained above are denoted by the same reference numerals and signs and redundant explanation of the components is omitted. Both of a first lens 61 and a second lens 62 are lenses configuring a projection optical system that projects video light. The light source device 11, the spatial- light modulating device 14, the first lens 61, the light source unit for detection 24, and the detecting unit 25 are stored in the housing 19. The second lens 62 is provided to close the opening formed in the housing 19. The second lens 62 is an optical element that transmits video light received from the first lens 61 and emits the video light toward the outside of the housing 19.

The transmitting and reflecting section 26 is formed on an incident surface of the second lens 62 on which video light is made incident. The second lens 62 is coated with not-shown AR coat for reducing the reflection of visible light. Both of the light source unit for detection 24 and the detecting unit 25 are provided at outer edges of the second lens 62. The light source for detection 24 transmits detection light to the second lens 62. The second lens 62 propagates the detection light received from the light source unit for detection 24. The detecting unit 25 detects the detection light transmitted through the second lens 62.

Figure 9:
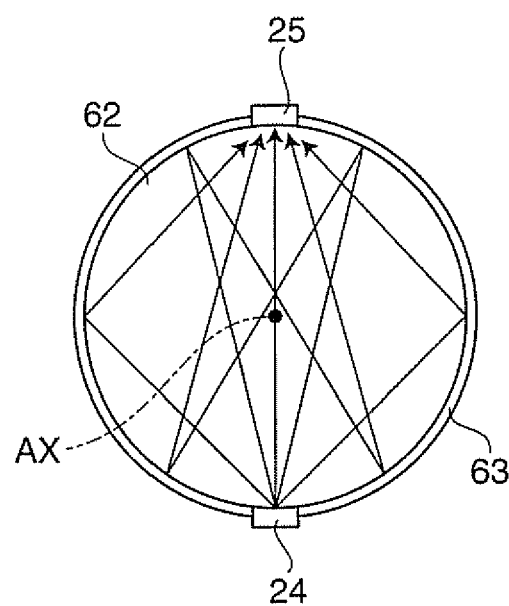
FIG. 9 is a diagram of a configuration of a second lens and the like on a surface orthogonal to an optical axis of a projection optical system.

FIG. 9 is a diagram of a configuration of the second lens 62 and around the second lens 62 on a surface orthogonal to an optical axis AX of a projection optical system. The light source unit for detection 24 and the detecting unit 25 are arranged to be opposed to each other via the second lens 62. A detection-light deflecting section 63 is formed in a position other than the light source unit for detection 24 and the detecting unit 25 at the outer edges of the second lens 62. The detection-light reflecting section 63 reflects detection light transmitted through the second lens 62. The detection-light reflecting section 63 is formed by using a highly reflective member that reflects infrared light. The detection light from the light source unit for detection 24 is, after being transmitted through the second lens 62, directly, or after being reflected on the detection-light reflecting section 63, made incident on the detecting unit 25.

Figure 10:
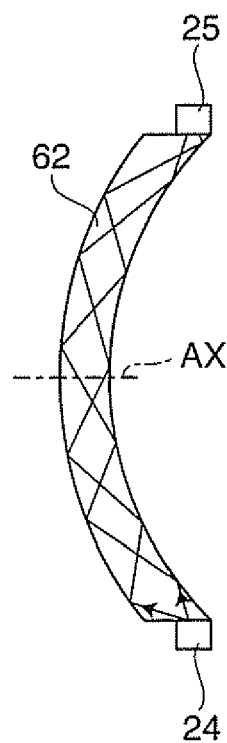
FIG. 10 is a diagram for explaining the behavior of detection light on a surface parallel to the optical axis.

FIG. 10 is a diagram for explaining a behavior of detection light on a surface parallel to the optical axis AX. Detection light from the light source unit for detection 24 propagates through the inside of the second lens 62 according to total reflection on an incident surface and an emission surface of the second lens 62. The detection light diffuses in the inside of the second lens 62 according to multiple reflection by the incident surface and the emission surface of the second lens 62 and the detection-light reflecting section 63.

Unless removal or breakage of the second lens 62 occurs, a light amount of the detection light detected by the detecting unit 25 is substantially fixed. When a part of the second lens 62 is broken, since the detection light leaks from a broken place, a light amount of the detection light detected by the detecting unit 25 changes. Since the detection light propagating through the inside of the second lens 62 is detected, it is possible to accurately detect the breakage of the second lens 62 and further reduce deficiencies. The positions of the light source unit for detection 24 and the detecting unit 25 are not limited to those shown in the figure and may be changed as appropriate. Instead of using the detection light from the detecting unit 25, fundamental wave light emitted from the SHG element 22 may be guided to the second lens 62 and used as detection light.

Figure 11:
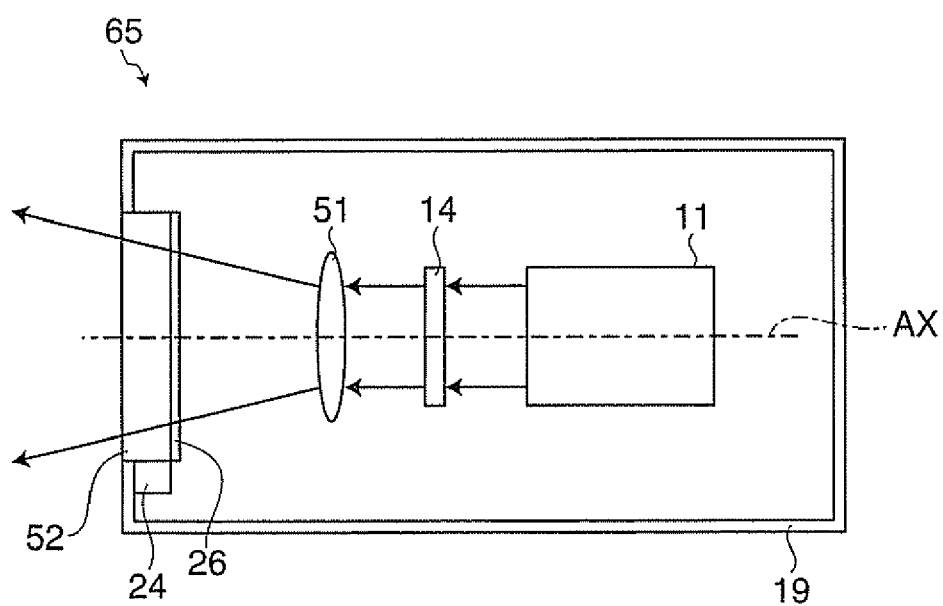
FIG. 11 is a diagram for explaining a projector according to a modification of the third embodiment.

FIG. 11 is a diagram for explaining a projector 65 according to a modification of this embodiment. The projector 65 according to this modification includes the transmitting unit 52 as an optical element. The light source unit for detection 24 and the detecting unit 25 are provided at outer edges of the transmitting unit 52. The light source unit for detection 24 is provided adjacent to the detecting unit 25. Assuming that the detecting unit 25 is provided on a paper surface depth side of the light source unit for detection 24, the detecting unit 25 is not shown in the figure.

Figure 12:
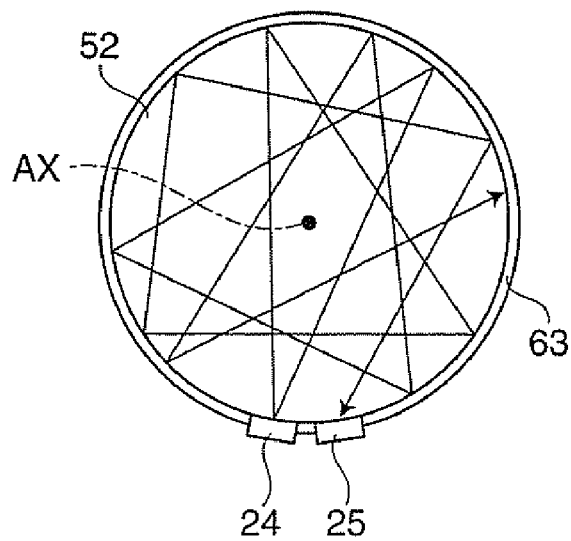
FIG. 12 is a diagram of a configuration of a transmitting unit and the like on a surface orthogonal to an optical axis of a projection optical system.

FIG. 12 is a diagram of a configuration of the transmitting unit 52 and around the transmitting unit 52 on a surface orthogonal to an optical axis AX of a projection optical system. A detection-light reflecting section 63 is formed in a position other than the light source unit for detection 24 and the detecting unit 25 at the outer edges of the transmitting unit 52. Since the light source unit for detection 24 is provided near the detecting unit 25, it is possible to effectively use the space in the housing 19 and easily design the projector. The light source unit for detection 24 and the detecting unit 25 only have to be provided close to each other and are not limited to be provided in positions shown in the figure.

Fourth Embodiment

Figure 13:
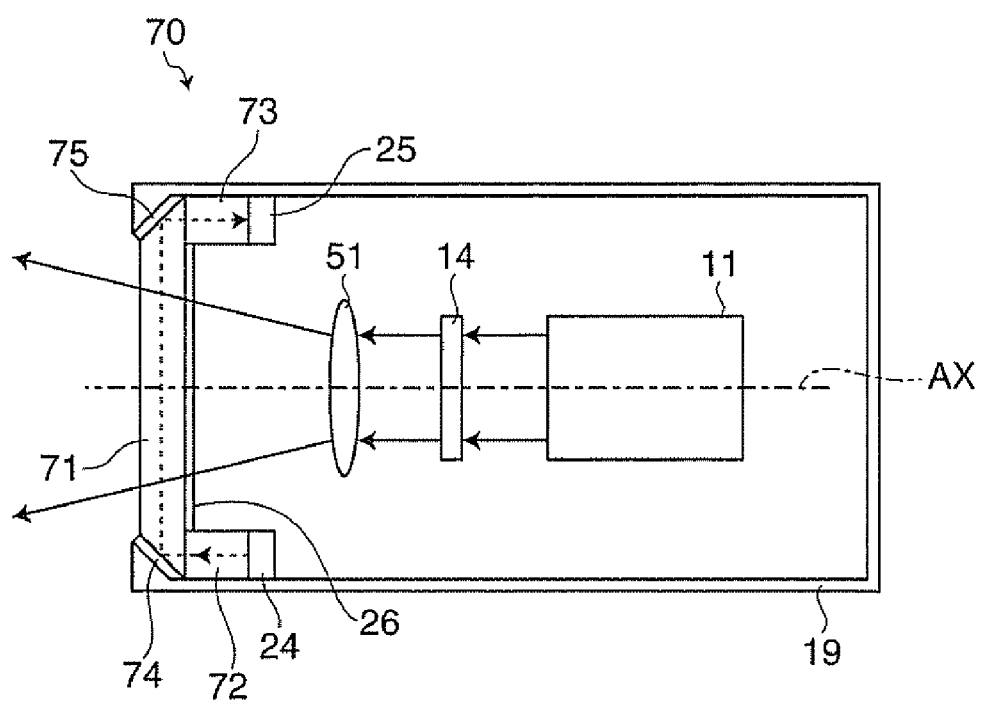
FIG. 13 is a diagram for explaining a projector according to a fourth embodiment of the invention.
Figure 14:
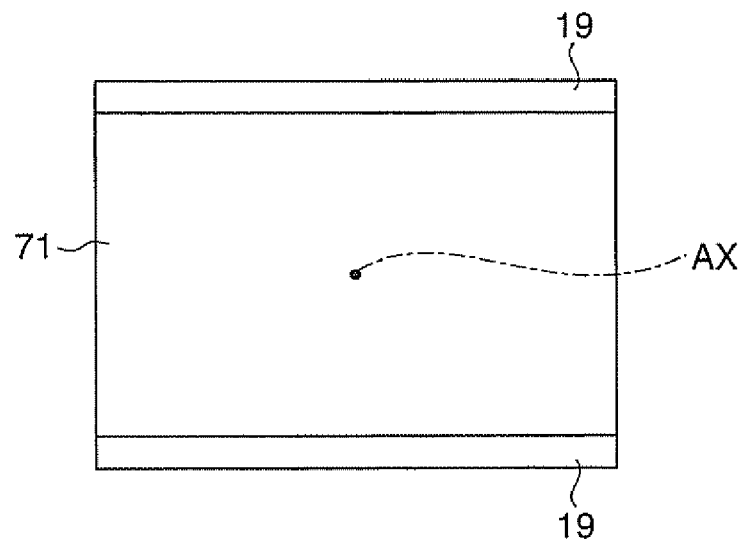
FIG. 14 is a diagram of a front configuration of the projector viewed from an emission surface side of a transmitting unit.

FIG. 13 is a diagram for explaining a projector 70 according to a fourth embodiment of the invention. FIG. 14 is a diagram of a front configuration of the projector 70 viewed from an emission surface side of a transmitting unit 71. Components same as those in the embodiments explained above are denoted by the same reference numerals and signs and redundant explanation of the components is omitted. The transmitting unit 71 is provided in front of the housing 19. The transmitting unit 71 is an optical element that transmits video light projected by the projection lens 51 and emits the video light toward the outside of the housing 19. The transmitting unit 71 is a transparent member formed in a plate shape. The transmitting and reflecting section 26 is formed on an incident surface on which the video light is made incident of the transmitting unit 71. The transmitting unit 71 is coated with not-shown AR coat for reducing the reflection of visible light. The light source unit for detection 24 and the detecting unit 25 are respectively provided in positions opposed to each other on an inner surface of the housing 19.

Figure 15:
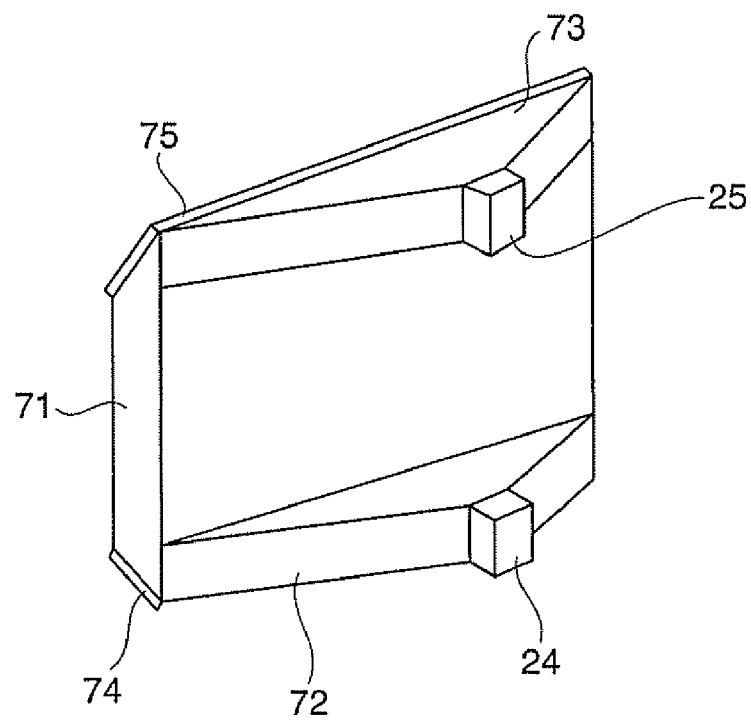
FIG. 15 is a diagram of a perspective configuration of the transmitting unit and around the transmitting unit.

FIG. 15 is a diagram of a perspective configuration of the transmitting unit 71 and around the transmitting unit 71. A first light guiding section 72 and a second light guiding section 73 are provided on an incident surface side of the transmitting unit 71. The first light guiding section 72 and the second light guiding section 73 are provided on two sides opposed to each other of a rectangular shape of the transmitting unit 71. The first light guiding section 72 is provided between the transmitting unit 71 and the light source unit for detection 24. The first light guiding section 72 guides detection light received from the light source unit for detection 24 to the transmitting unit 71. The transmitting unit 71 propagates the detection light received from the first light guiding section 72 to the second light guiding section 73. A first mirror 74 is provided in a position opposed to the first light guiding section 72 via the transmitting unit 71. An optical path of the detection light from the first light guiding section 72 is bent by the reflection on the first mirror 74 and travels to a side of the transmitting unit 71 on which the second light guiding section 73 is provided.

The second light guiding section 73 is provided between the transmitting unit 71 and the detecting unit 25. The second light guiding section 73 guides the detection light propagating through the transmitting unit 71 to the detecting unit 25. A second mirror 75 is provided in a position opposed to the second light guiding unit 73 via the transmitting unit 71. An optical path of the detection light propagating through the transmitting unit 71 from the first mirror 74 is bent by the reflection on the second mirror 75 and travels to the second light guiding section 73. The first mirror 74 and the second mirror 75 are formed by using highly reflective members that reflect infrared light. The detection light from the light source unit for detection 24 propagates through the inside of the first light guiding section 72, the transmitting unit 71, and the second light guiding section 73 while being totally reflected. The first light guiding section 72, the transmitting unit 71, and the second light guiding section 73 configure a waveguide path for propagating the detection light. The first light guiding section 72, the first mirror 74, the second mirror 75, and the second light guiding section 73 function as detection-light guiding sections that guide the detection light received from the light source unit for detection 24 to the detecting unit 25 through the transmitting unit 71.

The first light guiding section 72 and the second light guiding section 73 are formed by using transparent members. Between a refractive index n1 of the transparent member forming the transmitting unit 71 and a refractive index n2 of the transparent members forming the first light guiding section 72 and the second light guiding section 73, for example, a relation n1>n2 holds. The first light guiding section 72 and the second light guiding section 73 may be formed by using members having a refractive index substantially the same as the member forming the transmitting unit 71.

Unless removal or breakage of the transmitting unit 71 occurs, a light amount of detection light detected by the detecting unit 25 is substantially fixed. When a part of the transmitting unit 71 is broken, since the detection light leaks from a broken place, a light amount of the detection light detected by the detecting unit 25 changes. Since the detection light propagating through the inside of the transmitting unit 71 is detected, it is possible to accurately detect the breakage of the transmitting unit 71 and further reduce deficiencies. Since the first light guiding section 72, the second light guiding section 73, the first mirror 74, and the second mirror 75 are used, it is possible to guide the detection light from the light source unit for detection 24 to the detecting unit 25 provided in the surface of the housing 19 and to easily mount the light source unit for detection 24 and the detection unit 25. Instead of using the detection light from the detecting unit 25, fundamental wave light emitted from the SHG element 22 may be guided to the transmitting unit 71 and used as detection light.

Figure 16:
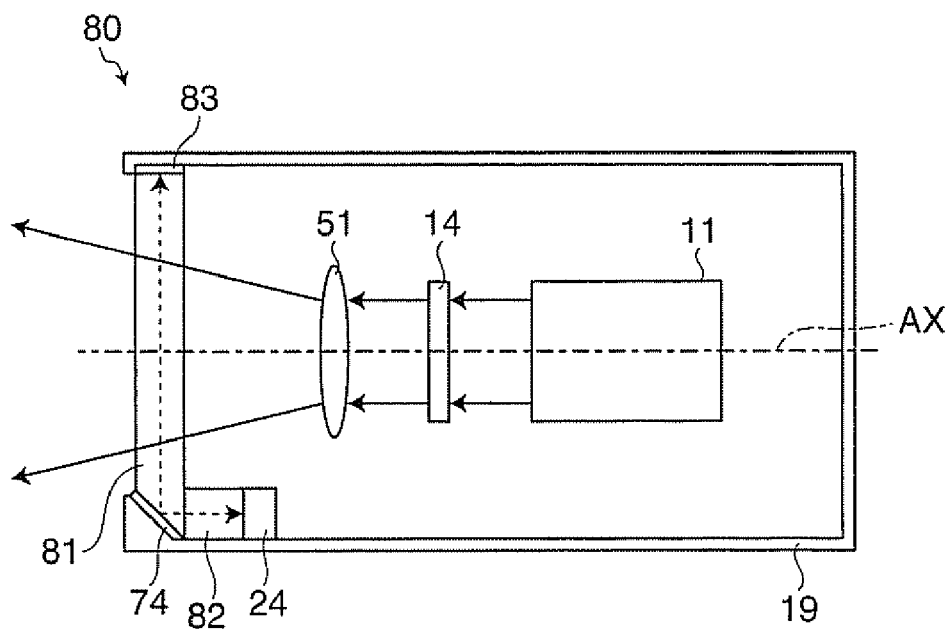
FIG. 16 is a diagram for explaining a projector according to a modification of the fourth embodiment.

FIG. 16 is a diagram for explaining a projector 80 according to a modification of this embodiment. The light source unit for detection 24 and the detecting unit 25 are provided adjacent to each other on the inner surface of the housing 19. Assuming that the detecting unit 25 is provided on a paper surface depth side of the light source unit for detection 24, the detecting unit 25 is not shown in the figure. A light guiding section 82 is provided on an incident surface side of a transmitting unit 81 and between the transmitting unit 81 and the set of the light source unit for detection 24 and the detecting unit 25. The light guiding section 82 guides detection light received from the light source unit for detection 24 to the transmitting unit 81 and guides the detection light received from the transmitting unit 81 to the detecting unit 25. A second mirror 83 is provided on the opposite side of a side on which the light guiding section 82 is provided of the transmitting unit 81.

Figure 17:
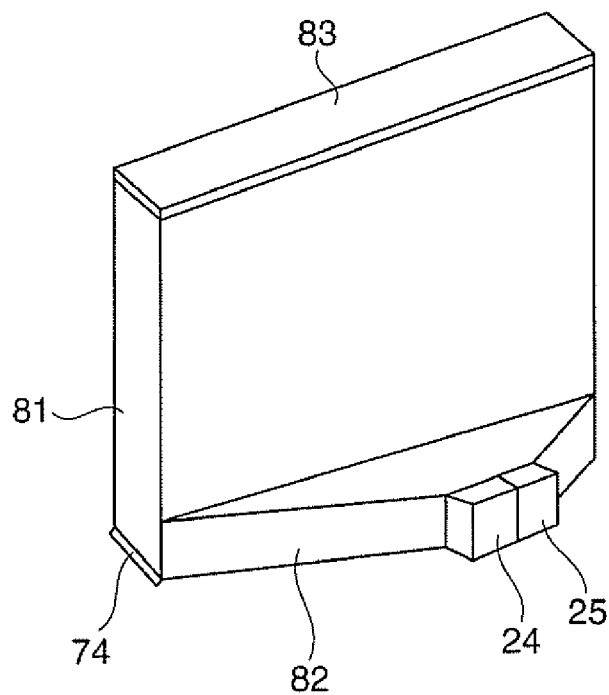
FIG. 17 is a diagram of a perspective configuration of a transmitting unit and around the transmitting unit.

FIG. 17 is a diagram of a perspective configuration of the transmitting unit 81 and around the transmitting unit 81. Detection light from the light source unit for detection 24 propagates through the inside of the light guiding section 82 and the transmitting unit 81 while being totally reflected. The light guiding section 82 and the transmitting unit 81 configure a waveguide path for propagating the detection light. An optical path of the detection light made incident on the second mirror 83 is folded by the reflection on the second mirror 83 and travels to the side of the transmitting unit 81 on which the light guiding section 82 is provided. An optical path of the detection light made incident on the first mirror 74 from the side on which the second mirror 83 is provided is folded by the reflection on the first mirror 74 and travels to the light guiding section 82. The light guiding section 82, the first mirror 74, and the second mirror 83 function as detection-light guiding sections that guide the detection light received from the light source unit for detection 24 to the detecting unit 25 through the transmitting unit 81. The transmitting unit 81 is configured the same as the transmitting unit 71 provided in the projector 70 except that a shape of a portion where the second mirror 83 is provided is different.

In this modification, it is possible to reduce light guiding sections 82 to one light guiding section 82 and configure the projector 80 small and simple. Since the light source unit for detection 24 and the detecting unit 25 are provided close to each other, it is possible to effectively use the space in the housing 19 and easily design the projector 80. In the projector 80 according to this modification, the light source unit for detection 24 and the detecting unit 25 only have to be provided close to each other and may be deformed as appropriate.

Fifth Embodiment

Figure 18:
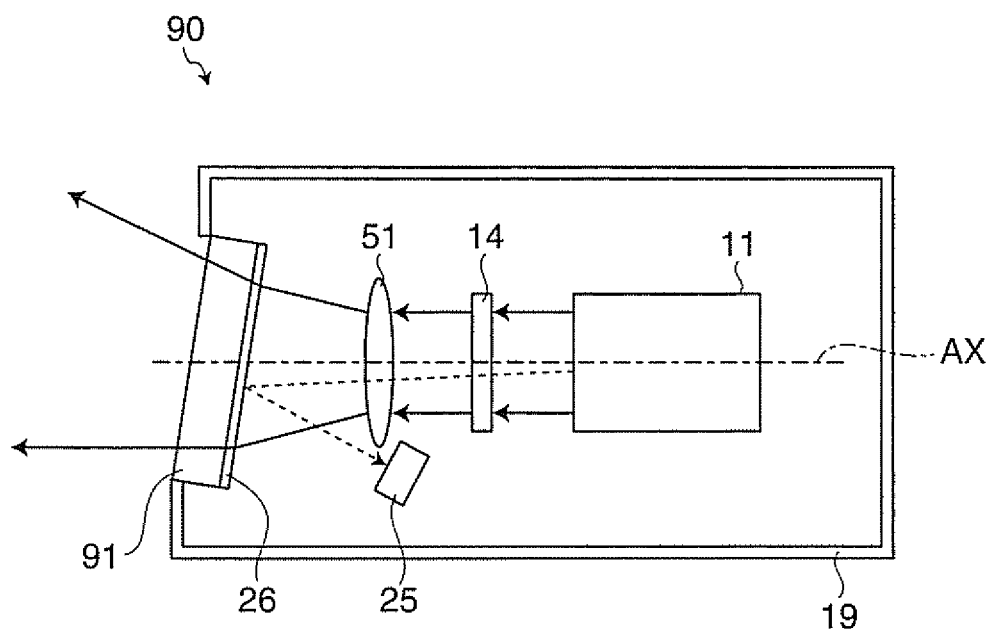
FIG. 18 is a diagram for explaining a projector according to a fifth embodiment of the invention.

FIG. 18 is a diagram for explaining a projector 90 according to a fifth embodiment of the invention. Components same as those in the embodiments explained above are denoted by the same reference numerals and signs and redundant explanation of the components is omitted. A transmitting unit 91 is an optical element that transmits video light projected by the projection lens 51 and emits the video light toward the outside of the housing 19. The transmitting unit 91 is a transparent member formed in a plate shape. The transmitting and reflecting section 26 is formed on an incident surface of the transmitting unit 91 on which video light is made incident. The transmitting unit 91 is coated with now-shown AR coat for reducing the reflection of visible light.

The transmitting unit 91 is arranged to be tilted with respect to the surface orthogonal to the optical axis AX of the projection lens 51. Both of an incident surface on which video light is made incident and an emission surface of the transmitting unit 91 from which the video light is emitted are tilted with respect to the surface orthogonal to the optical axis AX of the projection lens 51. The detection light is fundamental wave light emitted from the SHG element 22 (see FIG. 2) of the light source device 11. The detecting unit 25 detects the fundamental wave light reflected on the transmitting unit 91.

Since the incident surface of the transmitting unit 91 is tilted with respect to the surface orthogonal to the optical axis AX, mirror reflection of the video light on the incident surface of the transmitting unit 91 is reduced. This makes it possible to efficiently emit the video light. In the transmitting unit 91, at least the incident surface only has to be tilted with respect to the surface orthogonal to the optical axis AX. The transmitting unit 91 may be deformed as appropriate. For example, the transmitting unit 91 may be formed in a wedge shape including an incident surface tilted with respect to the surface orthogonal to the optical axis AX and an emission surface substantially orthogonal to the optical axis AX.

Sixth Embodiment

Figure 19:
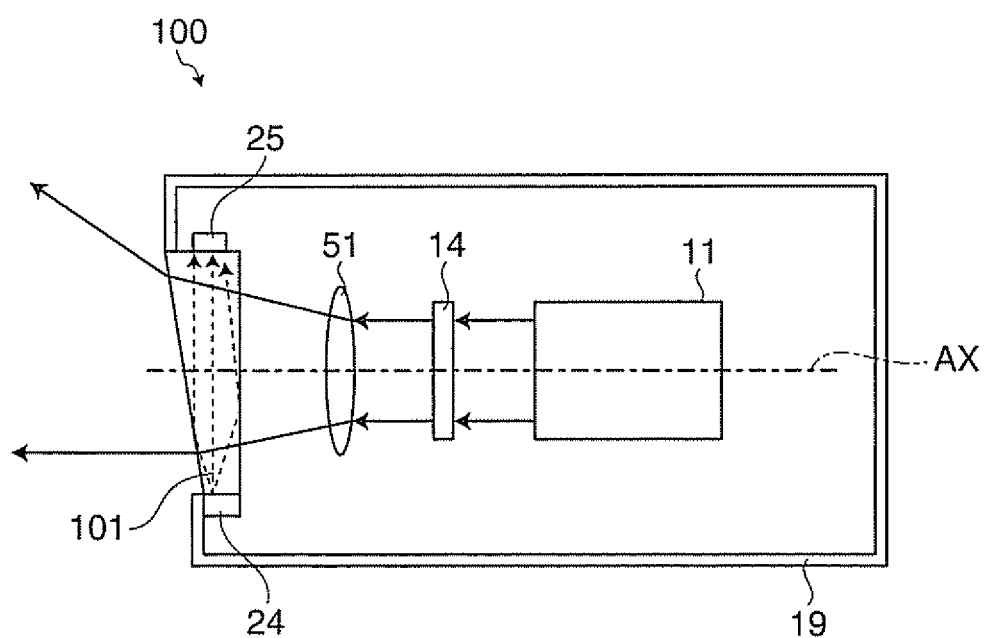
FIG. 19 is a diagram for explaining a projector according to a sixth embodiment of the invention.

FIG. 19 is diagram for explaining a projector 100 according to a sixth embodiment of the invention. Components same as those in the embodiments explained above are denoted by the same reference numerals and signs and redundant explanation of the components is omitted. A transmitting unit 101 is an optical element that transmits video light projected by the projection lens 51 and emits the video light toward the outside of the housing 19. The transmitting unit 101 is a transparent member having a wedge shape. The transmitting unit 101 includes an incident surface substantially orthogonal to the optical axis AX and an emission surface tilted with respect to the surface orthogonal to the optical axis AX. The light source unit for detection 24 and the detecting unit 25 are provided at outer edges of the transmitting unit 101. The transmitting unit 101 propagates detection light received from the light source unit for detection 24. The detecting unit 25 detects the detection light transmitted through the transmitting unit 101.

The transmitting unit 101 is formed in a taper shape that gradually widens from a side on which the light source unit for detection 24 is provided to a side on which the detecting unit 25 is provided. The detection light obliquely emitted from the light source unit for detection 24 is angle-converted to a direction from the light source unit for detection 24 to the detecting unit 25 (in this embodiment, a direction perpendicular to the optical axis AX) by total reflection on the incident surface and the emission surface of the transmitting unit 101. This makes it possible to efficiently cause the detection light received from the light source unit for detection 24 to travel to the detecting unit 25 and perform stable light amount detection by the detecting unit 25.

The video light transmitted through the transmitting unit 101 is emitted in a state in which a tilt angle is adjusted by refraction on the emission surface of the transmitting unit 101. Since the tilt angle can be adjusted by using the refraction on the transmitting unit 101, projection using the center of the projection lens 51 can be performed. Since the center of the projection lens 51 can be used, the diameter of the projection lens 51 can be reduced. Since the small projection lens 51 can be used, the projector 100 can be reduced in size. In the transmitting unit 101, at least the emission surface only has to be tilted with respect to the surface orthogonal to the optical axis AX. The transmitting unit 101 may be deformed as appropriate. For example, in the transmitting unit 101, not only the emission surface but also the incident surface may be tilted with respect to the surface orthogonal to the optical axis AX.

Besides being a laser beam source of a wavelength conversion type that emits a laser beam subjected to wavelength conversion by the wavelength converting section, the light source device may be a laser beam source that directly emits a laser beam having a desired wavelength without subjecting the laser beam to wavelength conversion. The projector according to each of the embodiments explained above is not limited to the projector including the light source device that emits a laser beam. Besides being the laser beam source, the light source device may be a solid-state light source such as a light emitting diode (LED) or a super luminescence diode (SLD) or a lamp such as an ultra-high pressure mercury lamp. Also, when the light source device other than the laser beam source is used, the light amount density on the emission surface of the optical element can be set in the same manner as when the laser beam source is used. The embodiments are explained on the basis of the standard established for a laser beam. However, when a standard is established for light other than the laser beam, the light amount density on the emission surface of the optical element may be set on the basis of the standard. When the light source device other than the laser beam source is used, infrared light from the light source unit for detection 24 is used as detection light. In this case, the transmitting and reflecting section formed in the optical element may be omitted. It is possible to suppress emission of the detection light to the outside of the housing 19 by making the detection light incident at a predetermined incident angle on the optical element and reflecting the detection light on the optical element or propagating the detection light in the optical element.

The projector according to each of the embodiments is not limited to the projector in which the transmission liquid crystal display device is used as the spatial-light modulating device. As the spatial-light modulating device, a reflection liquid crystal display device (Liquid Crystal On Silicon; LCOS), a DMD (Digital Micromirror Device), a GLV (Grating Light Valve), or the like may be used. The projector is not limited to the configuration including the spatial-light modulating device for each of color lights. The projector may be configured to modulate two or three or more color lights with one spatial-light modulating device. The projector is not limited to the projector including the spatial-light modulating device. The projector may be a projector of a laser scan type that scans a laser beam from a light source device using a scanning unit such as a galvanometer mirror and displays an image on an irradiated surface. The projector may be a slide projector that uses slides having image information. The configuration of the projector according to the invention may be applied to electronic apparatuses other than the projector, such as a monitor apparatus that images a subject illuminated by using light from a light source device.

The entire disclosure of Japanese Patent Application No. 2007-312065, filed Dec. 3, 2007 is expressly incorporated by reference herein.

What is claimed is:

1. A projector that projects video light corresponding to an image signal onto a display surface, the projector comprising:
   a light source device that emits light;
   a housing that houses at least the light source device;
   an optical element that transmits the video light projected onto the display surface and emits the video light toward the outside of the housing;
   a detecting unit that detects detection light supplied to the optical element and reflected on the optical element or diffused in the optical element; and a control unit that adjusts a light amount of the video light on the basis of a result of the detection by the detecting unit, wherein the projector is set such that, when the optical element is in a normal setting state, light amount density of the video light is equal to or lower than a predetermined value on an emission surface for emitting the video light of the optical element.

2. The projector according to claim 1, further comprising a light source unit for detection that emits the detection light.

3. The projector according to claim 1, wherein the light source device includes:
   a light source unit that emits light having a first wavelength; and
   a wavelength converting section that makes the light having the first wavelength, which is emitted from the light source unit, incident thereon to thereby emit the light having the first wavelength and light having a second wavelength different from the first wavelength, the detection light is the light having the first wavelength emitted from the wavelength converting section, and the video light is the light having the second wavelength emitted from the wavelength converting section.

4. The projector according to claim 1, wherein the optical element is a lens configuring a projection optical system that projects the video light.

5. The projector according to claim 1, wherein the optical element transmits the video light projected by the projection optical system.

6. The projector according to claim 5, wherein an incident surface on which the video light is made incident of the optical element is tilted with respect to a surface orthogonal to an optical axis of the projection optical system.

7. The projector according to claim 5, wherein the emission surface for emitting the video light of the optical element is tilted with respect to a surface orthogonal to an optical axis of the projection optical system.

8. The projector according to claim 1, wherein the detection light is invisible light.

9. The projector according to claim 8, further comprising a transmitting and reflecting section that reflects invisible light and transmits visible light.

10. The projector according to claim 1, wherein the detection light is made incident at a predetermined incident angle on an incident surface on which the video light of the optical element is made incident.

11. The projector according to claim 1, wherein the optical element propagates the detection light, and the detecting unit is provided at an outer edge of the optical element.

12. The projector according to claim 11, further comprising a detection-light reflecting section that is provided at an outer edge of the optical element and reflects the detection light.

13. The projector according to claim 1, wherein the light source unit for detection is provided near the detecting unit.

14. The projector according to claim 1, further comprising a detection-light guiding section that guides the detection light to the detecting unit.

15. The projector according to claim 1, wherein the light source device emits a laser beam.

* * * * *